United States Patent [19]

Yajima

[11] Patent Number: 4,513,846

[45] Date of Patent: Apr. 30, 1985

[54] MOTION SNUBBING DEVICE

[75] Inventor: Toshio Yajima, Atsugi, Japan

[73] Assignee: NHK Spring Co., Ltd., Yokohama, Japan

[21] Appl. No.: 524,847

[22] Filed: Aug. 19, 1983

[30] Foreign Application Priority Data

Aug. 27, 1982 [JP] Japan ................... 57/148776

[51] Int. Cl.³ .............................. F16F 7/10
[52] U.S. Cl. ..................... 188/380; 52/167; 248/636
[58] Field of Search .......... 52/167; 188/129, 134, 188/268, 378, 380; 248/562, 566, 569, 570, 636

[56] References Cited

U.S. PATENT DOCUMENTS

| Re. 29,221 | 5/1977 | Chensheng Yang | 188/378 |
| 2,838,137 | 6/1958 | Wallerstein, Jr. | 188/380 |
| 3,809,186 | 5/1974 | Suozzo | 188/268 |
| 4,346,793 | 8/1982 | Fuse et al. | 188/134 |

Primary Examiner—Duane A. Reger
Attorney, Agent, or Firm—Frishauf, Holtz, Goodman and Woodward

[57] ABSTRACT

A motion snubbing device in which an inertia mass is rotatably mounted on a rotary shaft through a slide bearing and opposite to a flexible member fixed to the rotary shaft. The shaft rotates in accordance with the relative reciprocating movement of paired strut members. The inertia mass and the flexible member are coupled by an acceleration-responsive coupling means comprising balls and recesses provided between them. The inertia mass is continuously and elastically urged in an axial direction by a spring member secured to the rotary shaft. The urging force of the spring member is adjustable by a spring mounting member screwed into the rotary shaft.

8 Claims, 10 Drawing Figures

MOTION SNUBBING DEVICE

BACKGROUND OF THE INVENTION

This invention relates to motion snubbing devices which are mounted between a supported body, such as a piping system, and a supporting body, such as buildings, for supporting piping systems in chemical plants, atomic power plants and so forth, so as to permit stable, low acceleration displacements between said supporting body and said supported body while restricting high acceleration displacements caused by sudden external forces.

Devices of this type are intended to permit the pipings to move slowly due to changes of temperature or the like, i.e, low acceleration displacements. They are further intended to support pipings in a stable manner over a long period of time, thus preventing damage to or rupture of the pipings by limiting the effects of any sudden external force. This is achieved by the braking operation of the interior of the devices in case of possible high acceleration displacements, i.e., displacements in excess of a threshold acceleration such as might be produced by earthquakes or the like.

Devices of this sort are generally called mechanical snubbers or arrestors and several types are well known. For example, U.S. Pat. Nos. 2,838,137, 3,809,186 and U.S. Pat. No. Re. 29,221 disclose this sort of device.

Devices of the type to which this invention pertains comprise a flexible member fixed on a rotary shaft and having a brake shoe, an inertia mass rotatably provided on the shaft in opposition to the member, and a frictional wall for braking-engagement with the brake shoe. Both the flexible member and the inertia mass are permitted to rotate together in a low acceleration range, but upon the occurrence of high accelerating displacements, the devices initiate a braking operation by engaging the brake shoe with the frictional wall due to the delayed motion of the inertia mass when it no longer rotates together with the flexible member. For example, U.S. Pat. No. 4,346,793 discloses this sort of device.

In devices of this type the inertia mass is rotatable on the shaft so that the brake operation surface is not restrained after high acceleration displacements have triggered the braking operation, even when a sudden external force is sequentially exerted in the course of the braking operation. That is, after a lag of operation of the inertia mass actuates the braking operation, the inertia mass rotates so that the braking operation is released, and this cycle is repeated so long as the external force continues to act thereon, thus preventing locking and damage to the devices. This is called the "self-release" function of the braking operation.

The conventional devices are constructed such that the inertia mass can rotate freely around the rotary shaft but is rigid in the axial direction. An impactive engagement of the brake shoe with the frictional surface may damage components of the device and bring about counteraction in the braking surface, thus lowering braking efficiency. Conventionally, it is difficult to adjust for irregularities in the finished devices because of rigid clearance between the brake shoe and the frictonal wall and in the positional adjustment of the worn frictional surface.

SUMMARY OF THE INVENTION

An object of the invention is to provide an improved motion snubbing device, which can efficiently perform a smooth braking operation when a high acceleration displacement occurs, and can also adjust a braking force with ease and is advantageous in eliminating drawbacks such as breakage of the components caused by external forces.

To achieve the above object the device of this invention is basically constructed to provide a resilient supporting means to resiliently and movably support the inertia mass on a rotary shaft in the axial direction, the supporting means permitting the inertia mass to move in response to the impact of the braking operation upon initiation of said operation.

The motion snubbing device of this invention can achieve effective braking operation due to smooth frictional engagement with the braking surface because the impact is absorbed by the resilient movement of the inertia mass, and it can also prevent the components from being broken by the impact. In the device of this invention, the frictional wall is constructed of a brake ring which is adjustably screwed in the axial direction into one of two strut members and has a means for locking the rotation of the brake ring. Thus, the timing of the braking operation can be controlled freely. The variation of clearance due to wear can be corrected easily.

Further, in a preferable embodiment of this invention a pair of opposed engaging surfaces are formed on each of the strut members at starting and terminating ends of relative movements of a pair of the strut members which move relative to each other, and a damping member is provided between these opposed engaging surfaces. As a result, the damping member can damp the impact on the engaging surfaces and save the components from breakage by the impact when the strut members are both elongated or compressed to a maximum. As a further result, this invention suggests improvements on construction of a connection portion which prevents the rotational torque in the snubbing device from rotating the same device, maintaining a good braking efficiency, and which can freely tilt at a desired angle.

DETAILED DESCRIPTION OF THE PREFERRED EMBODIMENTS

The details of the invention will be described below with reference to the accompanying drawings of some preferred embodiments.

Figure 1:
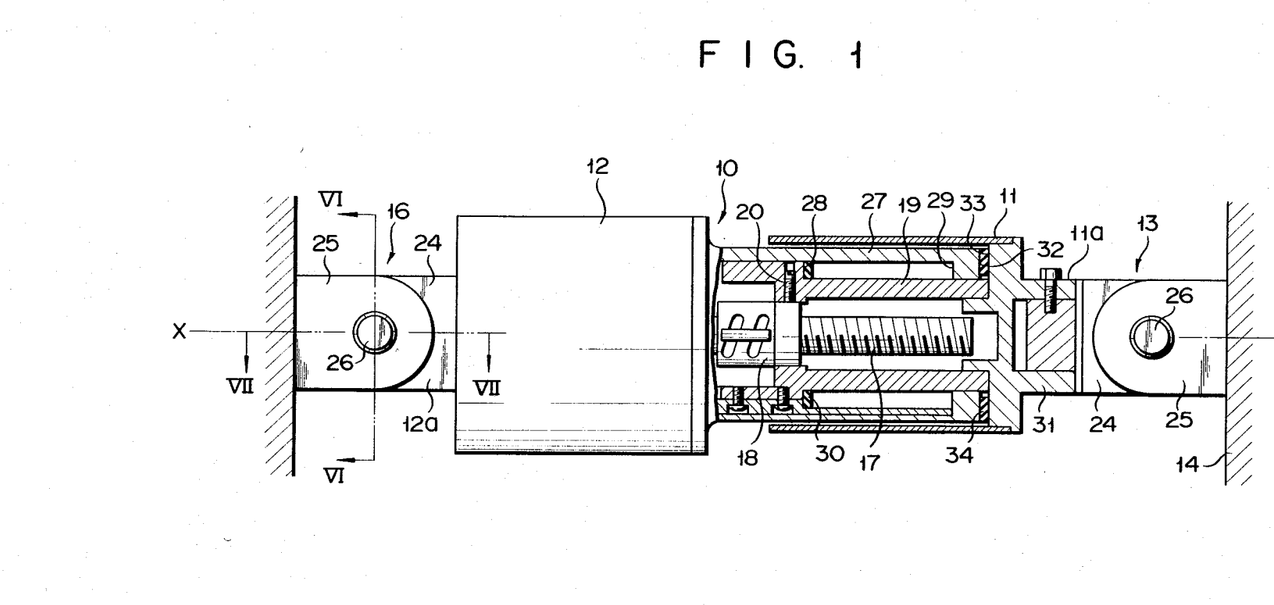
FIG. 1 is a fragmentary sectional view of the motion snubbinbg device according to the invention.

In FIG. 1, a motion snubbing device 10 of the invention is constructed in a cylindrical form and has a pair of strut or supporting members 11, 12 telescopically movable relative to each other along an axial line X—X in a longitudinal direction, and an end 11a of the strut member 11 is fixed by means of a connecting portion 13 on a supported body 14 such as piping in an atomic power plant, and another end 12a of the strut member 12 is fixed by means of a connecting portion 16 on a supporting body 15 such as a base to which pipings are provided. Usually, a plurality of the devices are disposed in the vertical direction with a substantial space along the piping of the supported body. But the direction of the device is not limited to the vertical direction, and FIG. 1 shows this device laid in the horizontal direction. Additionally, it makes no difference if the relation of fixture between the strut members 11, 12 and the supported body 14 and the supporting body 15 shown in this embodiment is reversed.

A motion conversion means comprises a ball-screw mechanism 18 which transmits a relative movement of both of the strut members 11, 12 to a rotary shaft 17 which is located within the strut members 11 and 12. Any conventional ball-screw mechanism is applicable and can be screwed with a cylinder portion 19 of the strut member 11 and secured by a set screw 20. The shaft 17 extends through and is screwed in the ball-screw mechanism 18 and has an end portion, as shown in FIG. 1, rotatably supported by means of a sleeve 23 and a bearing 22 on a frame 21 of the strut member 12, while being immovable in the axial direction.

Right and left connecting portions 13, 16 each has a first connecting member 24 coupled to the end of the corresponding strut members 11 and 12 and a second connecting member 25 which will be secured to the supporting body 15 or the supported body 14. The connecting members are coupled rotatably to each other by a link pin 26. A detailed description of the construction of the connecting portion will be given later.

In FIG. 1, a cylinder portion 19 of the strut member 11 and a cylinder portion 27 of the other strut member 12 are slidably engaged with each other and have opposite annular abutting surfaces 28, 29 formed along the radial direction from an axial line X—X on both cylinder portions 19, 27. One of the abutting surfaces 28 has an annular damping member 30 made of rubber or the like provided thereon. Both the opposite abutting surfaces 28, 29 define terminating positions of the maximum relative movement of the telescoped strut members. On the other hand, opposite annular abutting surfaces 32, 33 are formed along the radial direction from an axial line X—X between a cylinder portion 27 of the strut member 12 and an end member 31 constituting an end portion 11a of the strut member 11 and have an annular damping member 34 of rubber or the like formed therebetween. Both opposite abutting surfaces 32, 33 define the other terminal positions of the minimum relative movement of both the strut members. The provision of the damping member in both terminal positions, that is, between the abutting surfaces at the stroke ends, permits impact of the abutment to be dampened and prevents breakage of the components of the device. Under ordinary conditions of installation, both the strut members 11, 12 are arranged near the midpoint of the stroke end and therefore scarcely reach the stroke end. But if the device is installed vertically, there is a possiblity that the supporting members may move by their own weight into contact with the stroke end, and that acceleration forces may increase beyond the tolerable range with the abutting surfaces in contact with the stroke end. Thus, the damping members 30, 34 are intended to effectively prevent components from being broken by impact in the course of the installation operation.

Figure 2:
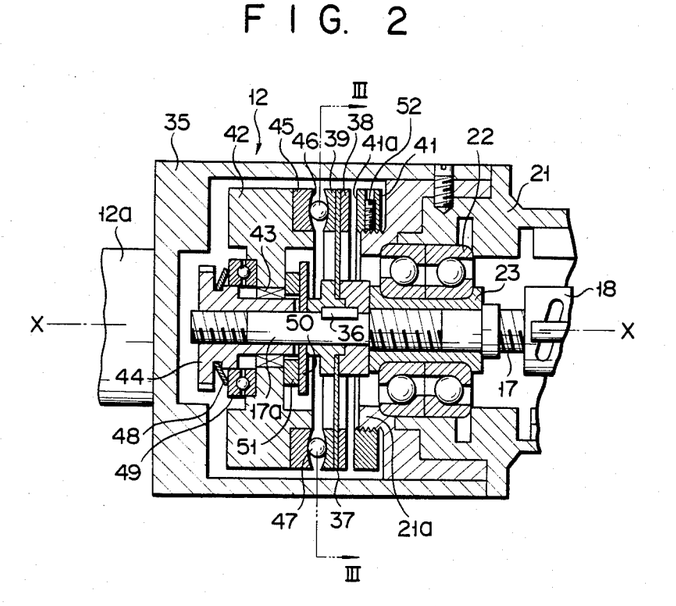
FIG. 2 is an enlarged cross-sectional view of the principal part shown in FIG. 1.

In FIG. 2, a terminal portion 17a of the rotary shaft 17 extends in a casing 35 of the strut member 12 where a disc-shaped flexible member 37 is secured by a key 36 in a radial direction from an axial line X—X.

Figure 3:
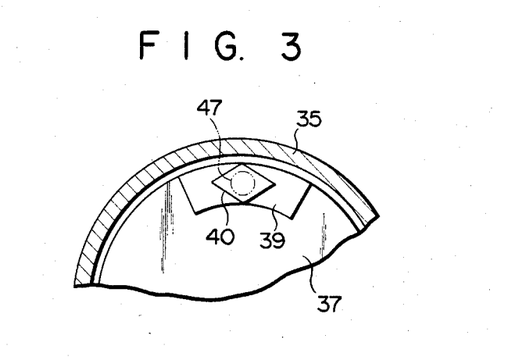
FIG. 3 is a partial view taken along line III—III in FIG. 2.

The flexible member 37 is formed of a circular thin metal plate with a sectioned brake shoe 38 on the other peripheral portion of one side of the member. In the corresponding outer peripheral portion of the other side of the member, sectioned blocks 39 are mounted at intervals as shown in FIG. 3 and each has a boat-like shaped recess 40 formed therein.

A brake ring 41 with a frictional braking surface 41a on the face opposite to said brake shoe 38 is provided on the right side of the flexible member 37. The ring 41 constitutes a frictional wall means opposite the brake shoe 38. The ring 41 has threads in its inner peripheral surface which are engaged with threads formed on the outer peripheral surface of a ring-shaped boss portion 21a integral with the frame 21. Thus, the clearance between the brake ring 41 and the brake shoe 38 is adjustable by varying the degree of engagement and thereafter moving the brake ring 41 along an axial line X—X. After the adjustment, the brake ring 41 is secured against rotation on the boss portion 21a by means of a set screw 52.

On the left side of the flexible member 37 opposite the brake ring 41 an inertia mass 42 is rotatably supported on the rotating shaft 17 through a slide bearing 43 and by the boss portion of a spring receiving member 44. A block 45 is embedded facing the block 39 and in the same way as block (shown in FIG. 3) on the outer peripheral face of the inertia mass 42. A boat-shaped recess 46 is formed on the block 45 and a ball 47 as a rolling means is interposed between each of the recesses 46 and the recesses 40 of the corresponding block 39. An acceleration-responsive coupling mesns is composed of the recesses 40, 46 and the balls 47.

The inertia mass 42 is biased toward the flexible member 37 along an axial line X—X through a bearing 49 by a spring member 48 composed of a disc spring. The spring member 48 is supported by said spring receiving member 44 screwed into the terminal portion 17a of the rotary shaft 17. The bias given by the spring member 48 is adjustable by arranging the degree of screw engagement.

The inertia mass 42 is held in a specified position, as shown, against the biasing force given by the spring member 48 through a friction ring 51 and a stop plate 50 embedded in the rotary shaft 17.

As described above, the inertia mass 42 is continuously given a bias in one direction by the spring member 48; if an impact force is applied in the opposite direction, the inertia mass 42 can move elastically for some distance along the axial line X—X against this biasing force. A resilient supporting means which permits the inertia mass 42 to move in the axial direction is composed of the spring member 48 and the spring receiving member 44.

The supporting means may be composed of a compression coil spring or a rubber material or the like instead of the disc spring which is provided in the embodiment. The inertia mass 42 can be composed of an elastic material. Many modifications are possible so long as the block 45 of the inertia mass 42 moves elastically in the direction away from the flexible member 37.

When an external force is exerted on this device through the supporting body 15 and the supported body 14, the strut members 11, 12 move relative to each other and the shaft 17 rotates, causing a combined rotation with the flexible member 37. If the external force is such as might be caused by a change of temperature or the like, and the acceleration of the movement therein is low, the coupled relation between the balls 47 and the boat-shaped recesses 40, 46 of the blocks 39, 45 is maintained and the inertia mass 42 will rotate with the flexible member 37. Accordingly, the strut members 11, 12 move slowly in unison, in response to the external force.

When the external force is an impactive force caused by an earthquake or the like, the flexible member 37 rotates rapdily with the shaft 17 while the inertia mass 42 rotates after a delay caused by its own inertial force; the inertia mass 42 becomes incapable of following the rotation of the flexible member 37 when the acceleration of the movement exceeds a determined value, i.e., the value of threshold acceleration. This causes outward movement of the balls 47 from the corresponding recesses 40, 46, accompanied by the deflection of the flexible member 37 under force in the axial direction, bringing the brake shoe 38 into contact with the braking frictional surface. Thus, the rotation of the flexible member 37 is terminated while the braking operation is being performed. The movement of the coupled strut members 11, 12 is thus restricted, maintaining the supporting body 15 against the external force.

In the embodiment of this invention, a direct collision of the brake shoe 38 against a frictional surface 41a of the brake ring 41 can be avoided in the case of an impactive external force. This is achieved by the arrangement of the inertia mass 42, which is capable of moving elastically in the axial direction against the spring member 48. The inertia mass 42 can move in this way only at the start of the braking operation and returns instantaneously to the previous position, which firmly maintains the braking operation, thus achieving an efficient, smooth braking performance and overcoming the drawbacks such as breakage of components caused by an impact.

The spring member 48 is selected from springs that have a spring force which is sufficiently stronger than the bending force of the flexible member 37.

If a continuous external force of high acceleration displacement is exerted on the device, engagement of the brake shoe 38 with the frictional surface 41a causes the inertia body 42 to rotate in such a manner that the balls 47 will roll down into the associated recesses 40, 46, and the flexible member 37 will spring back and release the brake shoe from the frictional surface 41a. This is repeated during the exertion of the external force, and so the braking operation can be automatically released.

Figure 4:
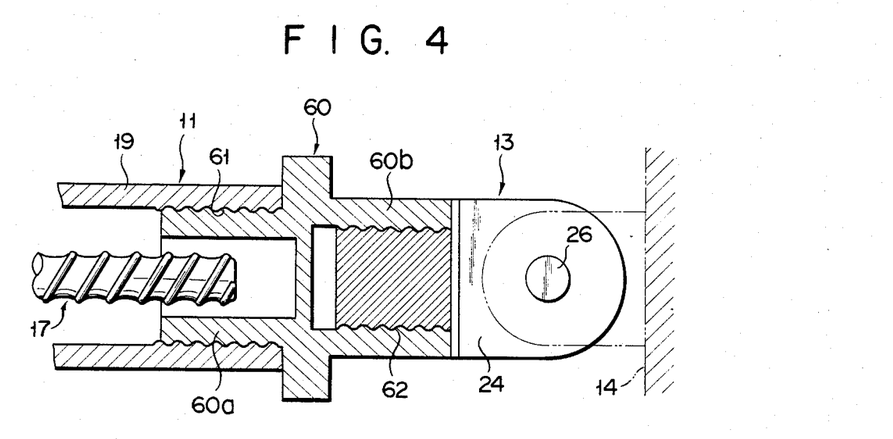
FIG. 4 is a cross-sectional view of a principal part showing another embodiment of the portion to be connected to the supporting or supported body.
Figure 5:
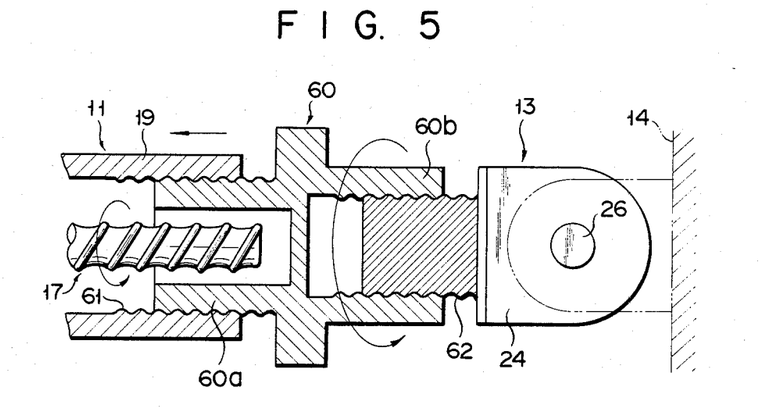
FIG. 5 is an illustrative view of motion in the embodiments of FIG. 4.

FIGS. 4 and 5 show a modification with turnbuckle-like members 60 interposed between the strut member 11 and the connecting portion 13. In the modifications the same reference numbers as those in the embodiment described above are used to designate the corresponding components and portions. A right-handed internal thread 61 is tapped on the inner periphery of the cylinder portion 19 of the strut member 11, and a left-handed external thread 61 having the same pitch as the internal thread is provided on the first connecting member 24 of the connecting portion 13. A turnbuckle-like member 60 with a right-handed external thread in one end portion 60a and a left-handed internal thread in the other end portion is meshingly interposed between the cylinder portion 19 and the connecting member 24.

The strut member 11 moves in the direction of the arrow by properly turning the turnbuckle-like member 60 as shown in FIG. 5. One can easily check in this modification to see whether or not the inner mechanism of the device is in an arrested condition due to seizing between the brake shoes 38 and the frictional surface 41a. This ability to check whether the device is sticking or is normally operative, that is, whether or not the device is tracking a slow displacement caused by a thermal change of the pipes and the like, has many merits in protecting the pipes and the like against damage due to internal troubles and facilitating the maintenance and testing of the device.

The position of the turnbuckle-like member 60 is not limited to that shown in the illustration, and it can be provided on the side of the other strut member 12.

Figures 6, 7, 8:
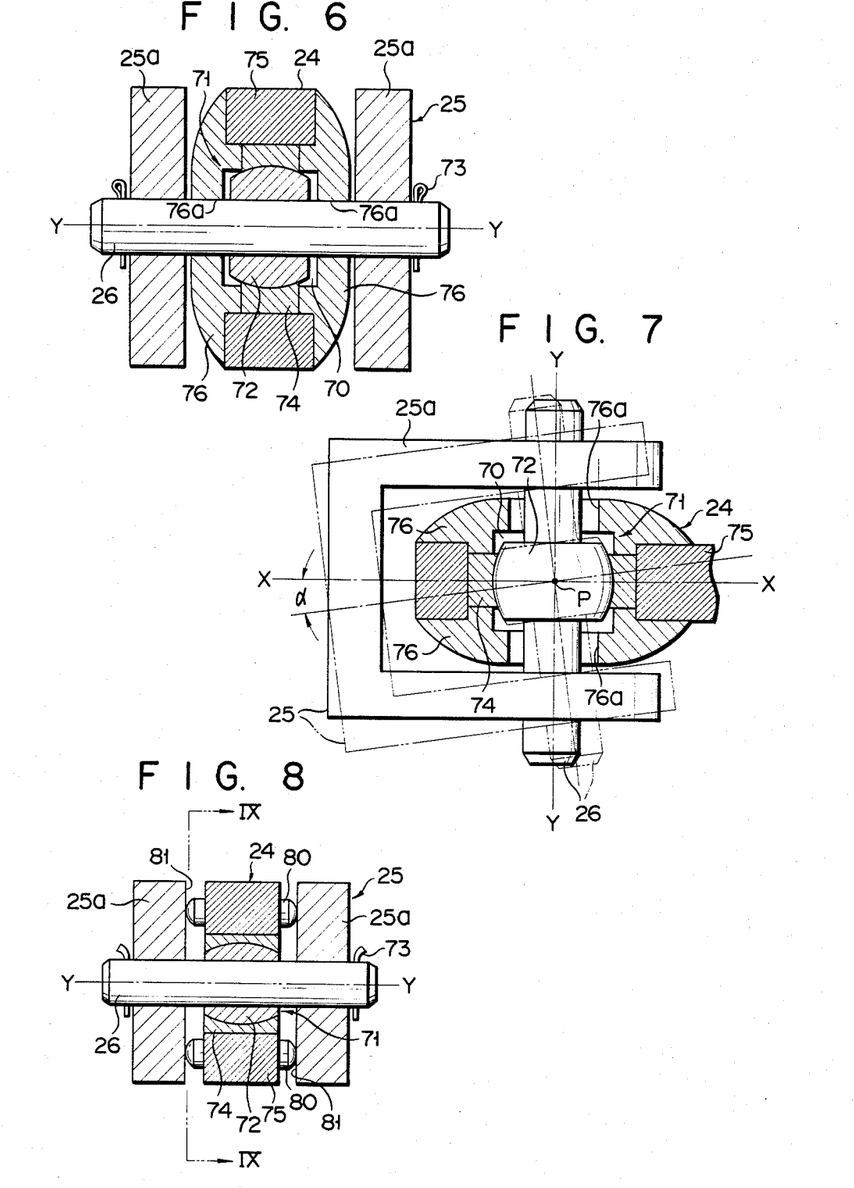
FIG. 6 is an enlarged cross-sectional view showing the construction of the connection portion and taken along line VI—VI in FIG. 1.
FIG. 7 is an enlarged view taken along line VII—VII in FIG. 1 and showing the movement of the connecting portion shown in FIG. 6 in an added broken line.
FIG. 8 is an cross-sectional view showing the same cross-section as shown in FIG. 6 to illustrate a modified construction of the connection portion.

In FIGS. 6 and 7, the first connecting member 24 of the connecting portion 16 receives a spherical bearing 71 in its inner space 70 where an inner race 72 has a link pin 26 engaged therewith and has an end portion projecting outwardly through a pair of elongate grooves 76a formed in the side of the first connecting member 24. Each of the projecting ends of the shaft 26 extends through parallel arms 25a of a U-shaped second connecting member 25. The pin 26 has an axial line Y—Y in the direction vertical to the axial line X—X.

Said first connecting member 24 comprises an outer race 74 of the spherical bearing 71, an outer peripheral ring-shaped portion 75 formed integrally with the end portion 12a of the supporting member 12 to support the outer race 74 and a pair of side plates 76 engaged with the outer peripheral portion 75 and fixed therewith by a suitable means such as a setscrew. The sides of the side plates 76 are shaped in the form of a sphere or a cone. The inner space 70 of the first connecting member 24 has some lateral play relative to the inner race 72 of the spherical bearing 71. The pair of elongate grooves 76a are formed to extend through both side plates 76 and have their longitudinal direction along the axial line X—X and their width approximately the same as the diameter of the link pin 26 as is seen in FIG. 6. The first connecting member 24 moves rotatively around the axial line Y—Y relative to the second connecting member 25 while the rotation of the member 24 around the axial line X—X is prohibited by the pin 26 and the elongate grooves 76a. In contrast, as shown in FIG. 7, the pin 26 can move rotatively with the inner race 72 of the spherical bearing 71 around a center P of the bearing in a plane including the axial line Y—Y in a range defined by the elongate grooves 76a. That is, the first and second connecting members 24, 25 can rock relatively not only around the axial line Y—Y of the shaft 26, but also in a plane including the axial line X—X as illustrated by an angle (α).

This makes the installation smooth and protects the connecting portion 16 of the device from breakage or the like even when the supporting body 15 to which the second connecting member 25 is attached is somewhat inclined. It is understood that the connecting portion 16 can rock in two directions. This construction can be achieved by joining two link pins provided in the longitudinal direction by means of a link. However, the resultant device has an undesirably long connecting portion.

In the device of this invention the spherical bearing is provided to solve the problem of the length of the connecting portion with the elongate grooves 76a being provided to inhibit undesirable rotation around the axial line X—X in the longitudinal direction.

Figure 9:
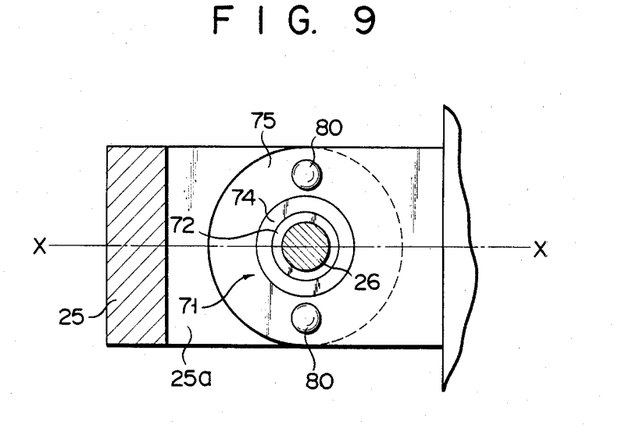
FIG. 9 is a view of the connecting portion taken along line IX—IX in FIG. 8.
Figure 10:
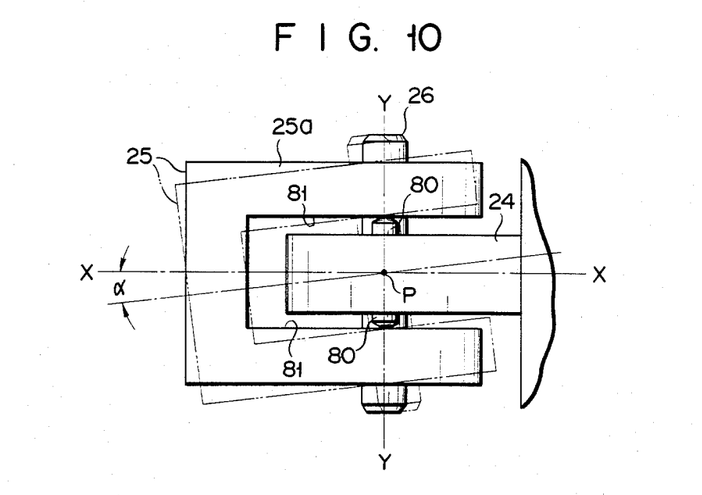
FIG. 10 shows the top view of FIG. 9 and the movement of the connecting portion in an added broken line.

FIGS. 8 to 10 show another modification of the connecting portion where the same reference numbers designate the corresponding portions and components.

A second connecting member 25 has the same construction as above. Similarly, the inner race 7 of the spherical bearing 71 is fixed to the link pin 26. Both end portions of the pin 26 are supported by the arm 25a of the second connecting member, and the outer race 74 of the spherical bearing is supported by the external peripheral portion 75 of the first connecting member 24.

This, however, differs from the foregoing constructions in that the side plates surrounding the spherical bearing 71 are replaced by protrusions 80 provided on both sides of the first connecting member in the direction normal to the axial line X—X, with the pin 26 being interposed therebetween. The heads of each of the protrusions 80 are rounded spherically and are placed in contact with the inner surface of the arm 25a of the second connecting member 25. The protrusions 80 prohibit the first connecting member 24 from rotating around the axial line X—X relative to the second connecting member 25, while the first and second connecting members 24, 25 can make relative rotations as illustrated in FIG. 10 by a degree (α) in the plane including the axial line Y—Y. During the relative rotation, the inner sides 81 of both the arms 25a slide on corresponding protrusions 80. This achieves two directional relative rotations of the connecting portions.

The constructions of the connecting portions in FIGS. 6 to 10 are similarly applicable to the connecting portion 13 in the supported body side.

What is claimed is:

1. A motion snubbing device provided between a supporting body and a supported body to permit low acceleration displacements of the supporting and supported bodies relative to each other while restricting high acceleration displacements caused by a sudden external force, comprising:
   a pair of cylindrical strut members capable of reciprocation relative to each other along the axial direction;
   connecting means for connecting one end portion of one of said strut members to the supporting body and one end portion of the other strut member to the supported body;
   motion converting means for converting relative reciprocation of both said supporting members into rotary motion;
   a rotary shaft supported by one of said paired supporting members and capable of being rotated by said motion converting means;
   a flexible member secured on said shaft and extending in the radial direction;
   frictional wall means provided on one of said strut members opposite to brake shoes provided on said flexible member on one side thereof;
   an inertia mass provided so as to be freely rotatable on said rotary shaft opposite to said wall means and interposing said flexible member therewith;
   resilient support means for supporting said inertia mass to be elastically movable in the axial direction of the shaft;
   acceleration-responsive connecting means for connecting the flexible member and the inertia mass in such a manner as to rotate said inertia mass and said flexible member in unison in an ordinary condition and permit a delay of rotation of said inertia mass from that of said flexible member in response to a high acceleration displacement, thereby bringing said brake shoes provided on said flexible member into engagement with said frictional wall means in response to the delay motion of said inertia mass to restrict the rotation of said flexible member.

2. A motion snubbing device according to claim 1, wherein said resilient support means include a spring member for pressing said inertia mass to give a bias to said flexible member along the axial direction of the rotary shaft and a spring mounting member for supporting said spring member.

3. A motion snubbing device according to claim 1, wherein said frictional wall means comprises a brake ring provided with a braking frictional surface opposite to said brake shoes on one side thereof, said ring having threads on the inner periphery which is engaged with threads on the outer periphery of a boss portion formed on one of said strut members, so that a clearance between a braking frictional surface and the brake shoes is adjustable by changing the degree of said engagement and fixed by fastening a set screw.

4. A motion snubbing device according to claim 1, wherein said paired strut members having abutting surfaces opposed to each other at one end portion and another end portion thereof along the axial direction and damping members interposed between said opposite abutting surfaces.

5. A motion snubbing device according to claim 1, wherein said connecting means includes a first connecting member provided with the end portion of one of the strut members and a second connecting member secured to the one of the supporting body and the supported body which corresponds to said one of the strut members.

6. A motion snubbing device according to claim 4, wherein said first connecting member and said strut member corresponding thereto are joined through a turnbuckle-like member and one end portion and the other end portion of said first connecting member engages with said support member and said first connecting member, respectively, by opposite turns of the screws relative to each other.

7. A motion snubbing device according to claim 4, wherein said first connecting member is supported by a spherical bearing embedded therein, a link pin which is fixed to an inner race of a bearing projects outwardly from a elongate groove formed on both sides of the first connecting member and supported by a pair of parallel arms provided on said second connecting member, thereby stopping the relative rotation around the longitudinal axial line of the first and second connecting members and allowing the first and second connecting members relative rotational movements in a plane including the axial line of said link pin in a definite range.

8. A motion snubbing device according to claim 4, wherein said first connecting member is supported by a spherical bearing, a pair of parallel arms provided on said first connecting member support a link pin fixed to an inner race of the bearing, protrusions are provided on both sides of said first connecting means in such a way as to interpose said link pin and in the direction normal to said pin, said protrusions are engaged with corresponding sides of the arms of second connecting means, thereby prohibiting the first and second connecting members relative rotation around the longitudinal axial line and allowing the first and second connecting members a relative rotational movement in a plane including the axial line of said link pin in a definite range.

* * * * *